(12) United States Patent  (10) Patent No.: US 8,042,640 B2
Namiki  (45) Date of Patent: Oct. 25, 2011

(54) VEHICLE-BODY STRUCTURE FOR MOTORCYCLE

(75) Inventor: Hideo Namiki, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 54 days.

(21) Appl. No.: 12/629,554

(22) Filed: Dec. 2, 2009

(65) Prior Publication Data

US 2010/0148469 A1  Jun. 17, 2010

(30) Foreign Application Priority Data

Dec. 15, 2008 (JP) .................................. 2008-318926

(51) Int. Cl.
*B60R 19/02* (2006.01)
(52) U.S. Cl. ........................................ 180/219; 293/105
(58) Field of Classification Search .................. 280/784; 296/187.1; 293/105; 180/218, 219, 220, 180/222

See application file for complete search history.

(56) References Cited

U.S. PATENT DOCUMENTS

| 5,605,353 | A | * | 2/1997 | Moss et al. | 280/784 |
| 6,053,564 | A | * | 4/2000 | Kamata et al. | 296/187.09 |
| 6,364,358 | B1 | * | 4/2002 | Miller | 280/784 |
| 6,460,889 | B2 | * | 10/2002 | Iyanagi et al. | 280/784 |
| 6,511,119 | B2 | * | 1/2003 | Takase et al. | 296/187.09 |
| 6,631,942 | B1 | * | 10/2003 | Kitagawa | 296/187.1 |
| 2003/0141712 | A1 | * | 7/2003 | Miyasaka | 280/784 |
| 2008/0023954 | A1 | * | 1/2008 | Eichberger et al. | 280/784 |

FOREIGN PATENT DOCUMENTS

JP 2002-264866 A 9/2002

* cited by examiner

*Primary Examiner* — Tony H. Winner

(74) *Attorney, Agent, or Firm* — Birch, Stewart, Kolasch & Birch, LLP

(57) ABSTRACT

A vehicle-body structure for a motorcycle which is capable of suppressing the reduction of a contact load of a rear wheel by reducing a load applied to a vehicle-body frame at an application of an excessive load from the front of a vehicle. In a vehicle-body structure for a motorcycle including a head pipe supporting a front wheel in front of a vehicle-body frame, a guide member guides the front wheel obliquely rearwardly during an application of an excessive load to the front wheel. The guide member is disposed rearwardly of the front wheel and at the front portion of the vehicle-body frame.

20 Claims, 5 Drawing Sheets

VEHICLE-BODY STRUCTURE FOR MOTORCYCLE

CROSS-REFERENCE TO RELATED APPLICATIONS

The present application claims priority under 35 USC 119 to Japanese Patent Application No. 2008-318926 filed on Dec. 15, 2008 the entire contents of which are hereby incorporated by reference.

BACKGROUND OF THE INVENTION

1. Field of the Invention

The present invention relates to a vehicle-body structure for a motorcycle.

2. Description of Background Art

A vehicle, for example a motorcycle, is known that includes a function of absorbing a load at an application of excessive load from the front of the vehicle. More specifically, a front portion of a vehicle-body frame is formed in a shape like a bow of a ship with the front portion being positioned behind a front wheel. Further, the tip of the bow is offset to the right or the left from the center line, in the width direction, of the front wheel of the motorcycle maintained in the state of traveling straight. See, for example, Japanese Patent Application Publication No. 2002-264866.

In such a motorcycle, when the front wheel is deformed to the front portion of the vehicle-body frame at the application of excessive load from the front of the vehicle, the offset-tip of the bow deflects the front wheel from the vehicle-body frame so that the front wheel is deformed sufficiently. As a result, the excessive load is smoothly absorbed since interference between the front wheel and the vehicle-body frame is prevented.

According to Japanese Patent Application Publication No. 2002-264866, the excessive load applied from the front of the vehicle can be absorbed when the motorcycle is traveling straight. However, in a case where an excessive load is applied when the front wheel is steered to the side opposite to that to which the tip of the bow is offset, the load is applied to the tip of the bow, and a forward rotating behavior of the vehicle body may not be suppressed sufficiently. More specifically, consider a case where the load received by the front wheel is applied to the vehicle-body frame. In this case, when the vehicle body and the colliding object move away from each other due to reaction after the application of the excessive load, a remaining moment of the vehicle-body frame may cause reduction of the contact load of the rear wheel.

SUMMARY AND OBJECTS OF THE INVENTION

The present invention has been made in view of the above-described circumstances. It is an object of an embodiment of the present invention to provide a vehicle-body structure for a motorcycle which is capable of suppressing reduction of a contact load of a rear wheel by reducing a load applied to a vehicle-body frame at an application of an excessive load from the front of a vehicle.

For the purpose of solving the above-mentioned problems, according to an embodiment of the present invention a vehicle-body structure for a motorcycle 1 includes a steering system support part, for example, a head pipe 6, supporting a front wheel 2 in front of a vehicle-body frame 5. The vehicle-body structure includes a guide member 40 disposed rearward of the front wheel and at a front portion of the vehicle-body frame. The guide member guiding the front wheel extends obliquely rearwardly at an application of an excessive load to the front wheel. In addition, the vehicle-body structure includes the guide member extending from one side to the other side of the vehicle-body frame in a width direction thereof while being inclined to the width direction of the vehicle-body frame.

According to an embodiment of the present invention, includes a bumper member 50 provided to the vehicle-body frame at a position above the guide member, the bumper member extending forward of the steering system support part.

According to an embodiment of the present invention, a position at which the bumper member is supported on the vehicle-body frame is set higher than a center of gravity (for example, a center of gravity G in the embodiment) of the motorcycle when operated by a rider.

According to an embodiment of the present invention, the bumper member is attached in such a manner so as to surround a front fork 3 pivotally supporting the front wheel.

According to an embodiment of the present invention, the bumper member is formed by bending a metal pipe member into an arch shape.

According to an embodiment of the present invention, the bumper member includes a pair of upper pipes 51 and a pair of lower pipes 52. Each pair of the pair of upper pipes and the pair of lower pipes are connected at base ends thereof respectively to the sides of the vehicle-body frame in the width direction thereof, each of the upper and lower pipes being connected at a single portion on the vehicle-body frame. The upper pipes and the lower pipes are connected at front ends thereof to each other. The upper pipes and the lower pipes are formed into a substantially triangular shape when viewed from a side face of the vehicle-body frame.

According to an embodiment of the present invention, the guide member is disposed, which guides the front wheel obliquely rearward at an application of an excessive load to the front wheel. Accordingly, the load received by the front wheel can be released obliquely rearwardly. More specifically, when the front wheel is deformed to a position wherein the front wheel comes into contact with the vehicle-body frame at the application of the excessive load, it is forcibly steer the front wheel by guiding the front wheel obliquely rearward along the guide member. Thus, even when the front wheel is deformed at the application of the excessive load, interference between the front wheel and the vehicle-body frame can be prevented. Accordingly, a situation wherein deformation of the front wheel is prevented by the contact between the front wheel and the vehicle-body frame. Thus, the displacement space (load absorbing space) for the front wheel is secured.

Moreover, since the guide member extends from one side to the other side of the vehicle-body frame while being inclined in the width direction of the vehicle-body frame, the guide member does not have any tips except for the tips at both sides in the width direction of the vehicle-body frame, which is different from the conventional case where the vehicle-body frame is formed to have a shape of a bow. With this structure, when the front wheel is deformed to a position where the front wheel comes into contact with the vehicle-body frame at the application of the excessive load, the front wheel is steered to be guided obliquely rearwardly along the guide member, not only in a case where the motorcycle is traveling straight, but also in a case where the motorcycle is turning to the right or the left. Accordingly, the interference between the front wheel and the vehicle-body frame is prevented.

In this way, the load is effectively absorbed by the front wheel and released obliquely rearwardly, so that the load to act on the vehicle-body frame from the front wheel is reduced. As a result, the reduction of a contact load of a rear wheel can be suppressed.

According to an embodiment of the present invention, the bumper member extending forward of the steering system support part is provided to the vehicle-body frame. Accordingly, the load applied to the front wheel is also applied to the bumper member. Thus, the excessive load acting on the front wheel can be absorbed also by the bumper member. As a result, the excessive load acting on the front wheel can be reduced, so that the reduction of the contact load of the rear wheel is further suppressed.

According to an embodiment of the present invention, the position at which the bumper member is supported on the vehicle-body frame is set higher than the center of gravity of the motorcycle when operated by the rider. Accordingly, the moment acts on the motorcycle in such a direction that the contact load of the rear wheel increases at the application of the excessive load to the bumper member. As a result, the reduction of the contact load of the rear wheel at the application of the excessive load can be further suppressed.

According to an embodiment of the present invention, the bumper member is attached to the vehicle-body frame in such a manner so as to surround the front fork, thereby protecting the front fork. In addition, the load applied to the vehicle-body frame acts evenly in the vehicle-body width direction. Thus, the vehicle body does not lose balance even at the application of the excessive load.

According to an embodiment of the present invention, the bumper member is formed of the metal pipe. Accordingly, the bumper member is bent and deformed more easily than a bumper member formed of a solid member at the application of the load. Accordingly, the excessive load can be more easily absorbed by use of the bumper member.

According to an embodiment of the present invention, the upper pipes and the lower pipes are connected at their respective base ends to the vehicle-body frame. Thus, the bumper member is connected to the vehicle-body frame at four positions in total. Accordingly, the load applied to the upper pipes and lower pipes is dispersed, so that the load to be transferred to the connection portions are reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will be described below with reference to the drawings. Note that, a front-rear direction, a right-left direction, and the like in the following description are the same as those of the vehicle, unless otherwise noted.

Figure 1:
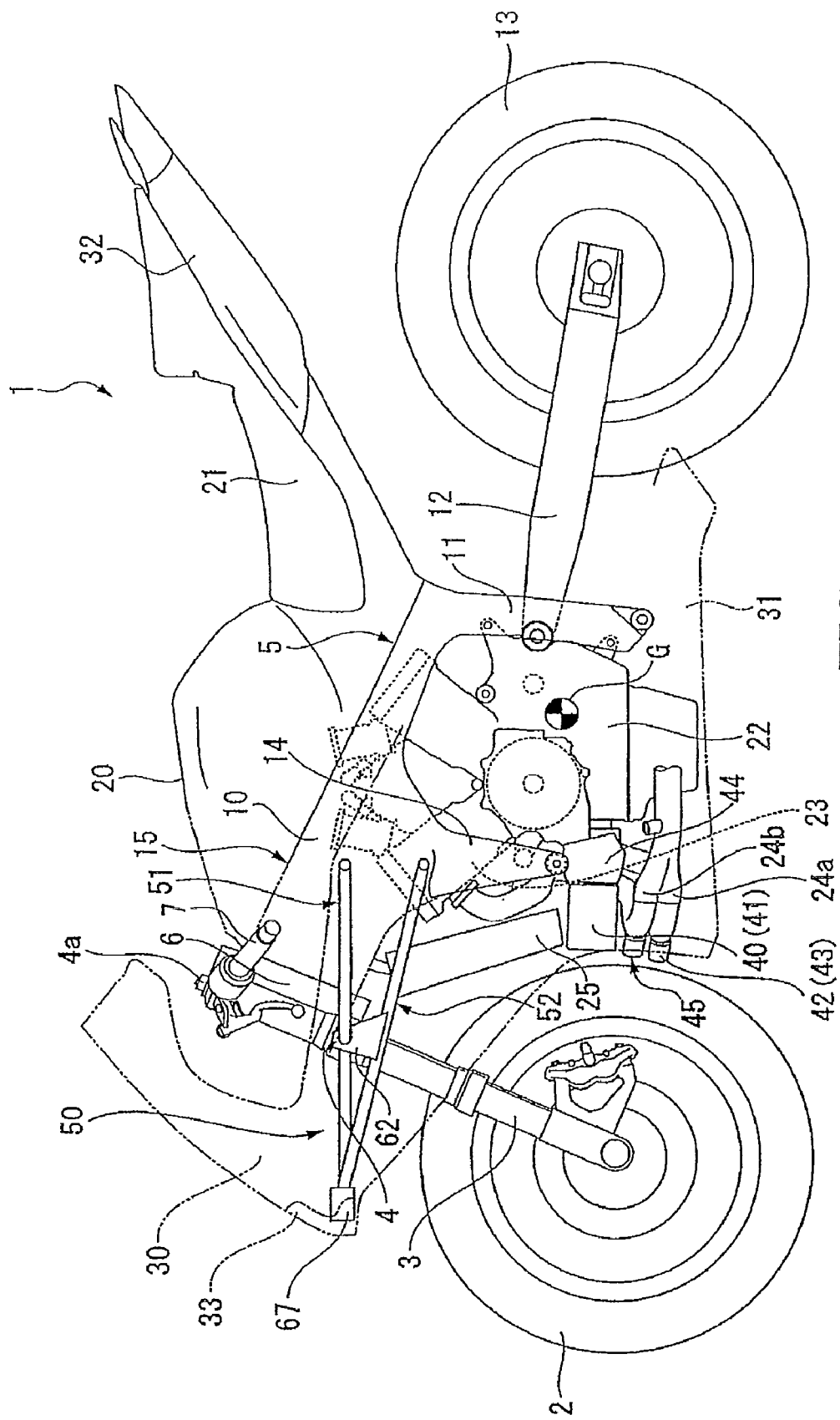
FIG. 1 is a left side view of a motorcycle according to an embodiment of the present invention.

As shown in FIG. 1, a front wheel 2 of a motorcycle 1 is pivotally supported on the lower end portion of a front fork 3. The upper portion of the front fork 3 is steerably pivoted to a head pipe (steering system support part) 6 of a vehicle-body frame 5 with a steering stem 4 provided therebetween. A bar handle 7 is attached on a top bridge 4a of the steering stem 4. Note that, the front wheel 2 and the front fork 3 constitute a front wheel steering system of the embodiment.

From the head pipe 6, right and left main frames 10 extend rearward, and are connected to right and left pivot plates 11, respectively. A swing arm 12 is pivoted at a front end portion thereof to the right and left pivot plates 11 so as to be swingable upwards and downwards. A rear wheel 13 is pivotally supported on a rear end portion of the swing arm 12. Moreover, right and left engine hangers 14 are formed respectively in the right and left main frames 10 at positions each between the head pipe 6 and a corresponding one of the right and left pivot plates 11. The left and right engine hangers 14 are each tapered downwardly. Note that, a portion mainly composed of the head pipe 6, the right and left main frames 10, the right and left pivot plates 11, and the right and left engine hangers 14 of the vehicle-body frame 5 is called a main frame part 15.

A fuel tank 20 is disposed above the main frame part 15. A rider's seat 21 is disposed at the rear of the fuel tank 20. Inside the main frame part 15, an engine 22, for example of 4-cylinder V-type, is fastened to the aforementioned right and left engine hangers 14, the engine 22 being a prime mover of the motorcycle 1. Exhaust pipes 24 are connected respectively to cylinders 23 of the engine 22. Each of the exhaust pipes 24 extend downwardly from the corresponding cylinder 23 of the engine 22, bends at a position below the engine 22, and is connected to a muffler (not shown) provided rearwardly of the engine 22. A radiator 25 supported by a stay (not shown) extending from the main frame part 15 is disposed at the front of the engine 22.

A front cowl 30 covers the surroundings of the head pipe 6. A side cowl 31 covers the side portions of the vehicle body. A rear cowl 32 covers the rear portions of the vehicle body. A head lamp 33 is disposed at the front end portion of the front cowl 30 (forward of the head pipe 6 and above the front wheel 2). The head lamp 33 and the front cowl 30 constitute the exterior appearance of the front portion of the vehicle.

Figure 2:
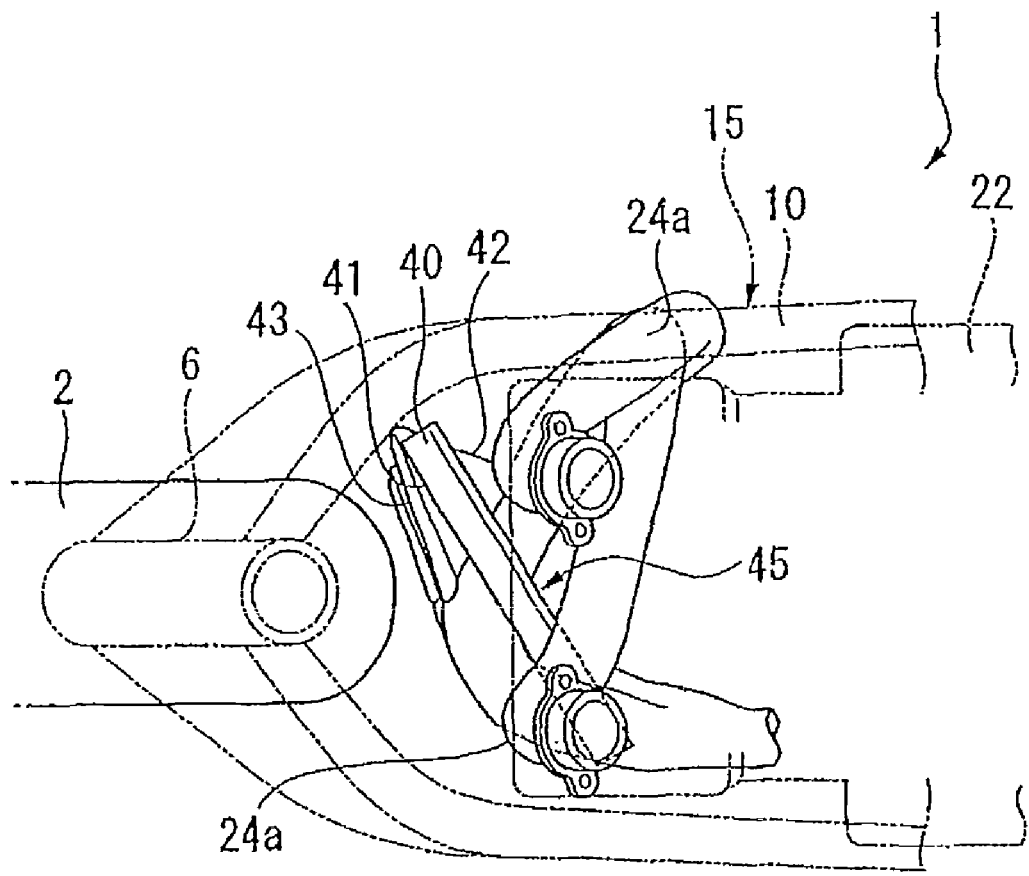
FIG. 2 is a top view of a main portion in the embodiment of the present invention.

As shown in FIGS. 1 and 2, a guide member 40 extending from one side to the other side in the width direction of the vehicle-body frame 5 is provided rearward of the front wheel 2 and at the front portion of the vehicle-body frame 5. The guide member 40 is a flat plate having a rectangular cross-section. The guide member 40 is disposed to cover the front face side of the lower portion of the engine 22 in a state where one side surface 41 extending along the thickness direction of the guide member 40 faces forward, and where the guide member 40 and the rotational axis of the front wheel 2 are at the same height in the vehicle-body height direction. More specifically, the guide member 40 is supported by a stay 44 extending from the front portion of the engine 22, and extends from one end side to the other end side of the vehicle-body frame 5 in the width direction thereof while being inclined to the width direction of the motorcycle 1. That is, the guide member 40 has its one-end side extending frontward and its other-end side extending rearwardly, with respect to the center axis of the motorcycle 1 in the width direction.

Moreover, guide bars 42 are provided to lower end portions of the exhaust pipes extending to the front of the engine 22 (reference numerals 24a and 24b in FIGS. 1 and 2) among the multiple exhaust pipes 24. The guide bars 42 extend forward from the exhaust pipes 24a and 24b, respectively. Each of the guide bars 42 is triangular in a plan view, and protrudes forward of the guide member 40 as well as the exhaust pipes 24a and 24b at the position below the guide member 40. An inclined surface 43 is formed on the front surface of each of the guide bars 42. Each inclined surface 43 extends approximately in parallel with the guide surface 41 of the guide member 40. The guide member 40 and the guide bars 42 constitute a guide 45 at a position rearwardly of the front wheel 2 and at the front face side of the vehicle-body frame 5. The guide 45 guides the front wheel 2 obliquely rearwardly at an application of an excessive load to the front wheel 2.

Figure 3:
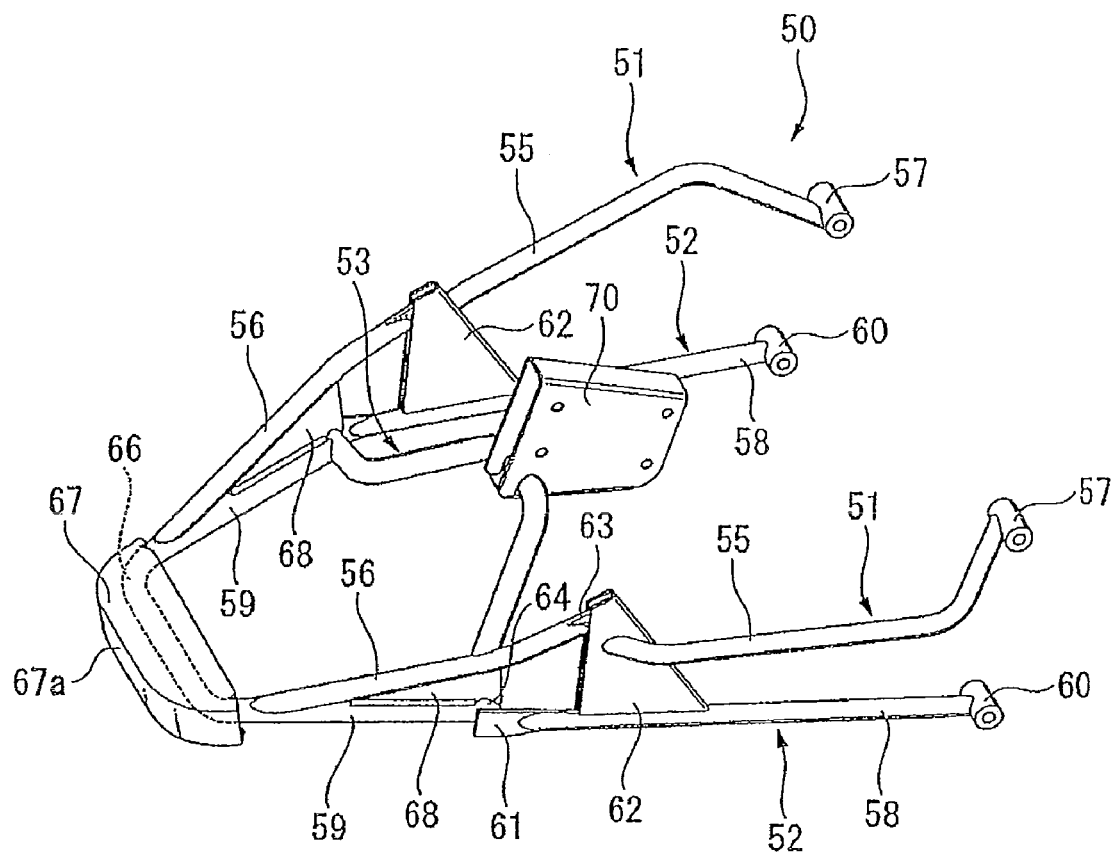
FIG. 3 is a perspective view of a bumper member.

As shown in FIGS. 1 and 3, a bumper member 50 is provided above the guide member 40 in the vehicle-body frame 5. The bumper member 50 extends forward from the main frames 10 and surrounds the front fork 3. The bumper member 50 is formed by bending a metal pipe into an arch shape so as to have a trapezoidal (isosceles trapezoidal) exterior appearance in the plan view.

More specifically, the bumper member 50 includes a pair of upper pipes 51, a pair of lower pipes 52, and a pair of center pipes 53, the pipes of each pair being arranged respectively on the right and left sides of the vehicle body.

The pair of upper pipes 51 extend substantially horizontally forward respectively from both sides, in the width direction, of the right and left main frames 10. Each of the upper pipes 51 is formed of two parts separated in the front-rear direction: a rear upper pipe 55 constituting the base end side; and a front upper pipe 56 constituting the front end side.

A boss portion 57 is formed at the base end of each of the rear upper pipes 55. The rear upper pipes 55 are fixedly fastened to the right and left main frames 10 by bolts and the like via the boss portions 57. Each of the rear upper pipes 55 extends obliquely forward (sideways) from the boss portion 57 in the vehicle body, bends forward so as to extend along the inner periphery of the front cowl 30, and extends to such a position so as to reach the head pipe 6 in the vehicle-body front-rear direction.

Meanwhile, the pair of lower pipes 52 are disposed along the upper pipes 51 in the height direction of the right and left main frames 10, and extend forward respectively from both sides, in the width direction, of the right and left main frames 10 while being inclined upward. That is, the bumper member 50 is formed in a triangular shape in a side view (when viewed from a side of the vehicle-body frame 5). Like the upper pipes 51 described above, each of the lower pipes 52 is formed of two parts separated in the vehicle-body front-rear direction: a rear lower pipe 58 constituting the base end side; and a front lower pipe 59 constituting the front end side.

A boss portion 60 is formed at the base end of each of the rear lower pipes 58. The rear lower pipes 58 are fixedly fastened to the right and left main frames 10, at positions below the boss portions 57 of the rear upper pipes 55, by bolts and the like via the boss portions 60. Each of the rear lower pipes 58 extends forward from the boss portion 60 while being inclined upwardly, and the distance between the rear lower pipe 58 and the rear upper pipe 55 in the height direction gradually decreases from the base end to the front end. An attachment bearing surface 61 to be connected to the front lower pipe 59 is formed at the front end of each of the rear lower pipes 58.

The front ends of both of the rear upper pipe 55 and the rear lower pipe 58 on each side are connected to a support plate 62. Each support plate 62 is a plate formed of metal or the like and having a triangular shape in a plan view. The front end of the rear upper pipe 55 is connected to the upper portion of a side surface of the support plate 62 by welding or the like, and the upper portion on the front end side of the rear lower pipe 58 is connected to the periphery of the lower portion of the support plate 62 by welding or the like.

An attachment bearing surface 63 is formed at the base end portion of each of the front upper pipes 56. Each front upper pipe 56 is fixedly fastened to the upper portion of the corresponding support plate 62 by bolts or the like via the attachment bearing surface 63. The front pipe 56 extends from the base end to the front end, parallel to the horizontal plane, so as to reach the position of the front end of the head lamp 33.

A boss portion 64 is formed at the base end of each of the front lower pipes 59. Each front lower pipe 59 is securely fastened to the attachment bearing surface 61 of the rear lower pipe 58 by bolts and the like via the boss portion 64. Each front lower pipe 59 extends from the base end to the front end while being inclined upwardly, and is connected, at the front end thereof, to the front upper pipe 56.

A connection pipe 66 is connected to connection portions on the left and right sides in such a manner so as to be laid between the two connection portions, the connection portions each connecting the front upper pipe 56 and the front lower pipe 59. A connection plate 67 is provided to the connection pipe 66 so as to cover the connection pipe 66 from the front side. The connection plate 67 is a plate formed of metal or the like, and having a square U-shaped cross-section whose upper and lower end portions are bent rearward at angle of 90°. The connection plate 67 has, at the front portion thereof, a front surface portion 67a parallel to the width direction of the motorcycle 1. The front surface portion 67a is disposed so that the surface direction thereof coincides with the vehicle-body width direction, and is configured to be flush with the front end portion of the head lamp 33.

A side portion plate 68 is provided between the front upper pipe 56 and the front lower pipe 59 on each side to fill a gap therebetween in the height direction. A pair of left and right center pipes 53 are connected to the side portion plates 68, respectively, each of the center pipes 53 extending from the inner surface side of the corresponding side portion plate 68 toward the center of the vehicle body in the width direction. The base ends of the center pipes 53 extend inward in the vehicle-body width direction respectively from the side portion plates 68, and then extend obliquely rearward. A center plate 70 is provided at the front ends of the center pipes 53 to connect the two center pipes 53. The center plate 70 is a plate formed of metal or the like, and has a square U-shape whose end portions in its width direction are bent downwardly. The center pipes 53 are connected respectively to lower portions of the front end side of the center plate 70, while the rear end side of the center plate 70 is fixedly fastened to the head pipe 6.

Accordingly, the bumper member 50 is fixedly fastened to the main frame portion 15 at the pairs of boss portions 57 and 60, and the center plate 70. More specifically, the bumper member 50 is connected to the main frames 10, at four portions in total, by the boss portions 57 and 60 of the pairs of upper pipes 51 and the lower pipes 52, and is also connected to the head pipe 6, at two portions for example, by the center plate 70 (connected at six positions in total, for example). Here, the connection positions of the bumper member 50 on the main frame portion 15 (the boss portions 57 and 60 and the center plate 70) are set to be higher, in the vehicle-body height direction, than the center of gravity G of the motorcycle 1 when operated by a rider.

Next effects will be described.

Figure 4:
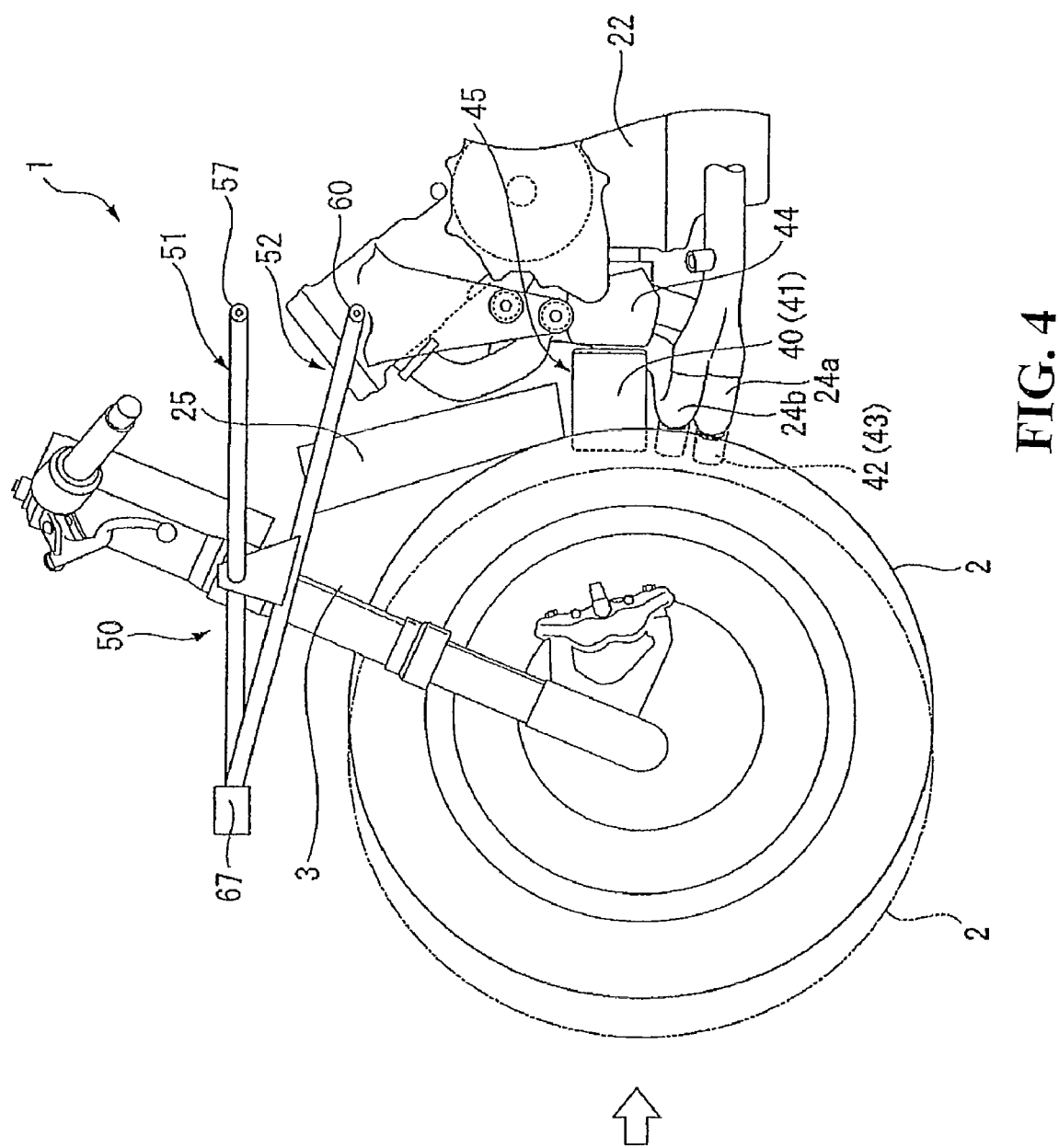
FIG. 4 is an explanatory view for explaining effects of the embodiment of the present invention, and is a left side view of the main portion corresponding to FIG. 2.

As shown in FIGS. 4 and 5, when an excessive load is applied to the front wheel 2 from the front of the vehicle body of the motorcycle 1 (see open arrows in FIGS. 4 and 5), the front wheel steering system such as the front wheel 2 and the front fork 3 (see FIG. 1) absorbs the impact while deforming. Meanwhile, a moment occurs in the vehicle body of the motorcycle 1 about the front wheel 2 in a direction in which the rear of the vehicle body moves upward, so that the contact load of the rear wheel 13 is reduced. Note that, in FIGS. 4 and 5, the front wheel 2 at a normal state is shown by dotted lines, and the front wheel 2 at the application of the excessive load is shown by solid lines.

Figure 5A:
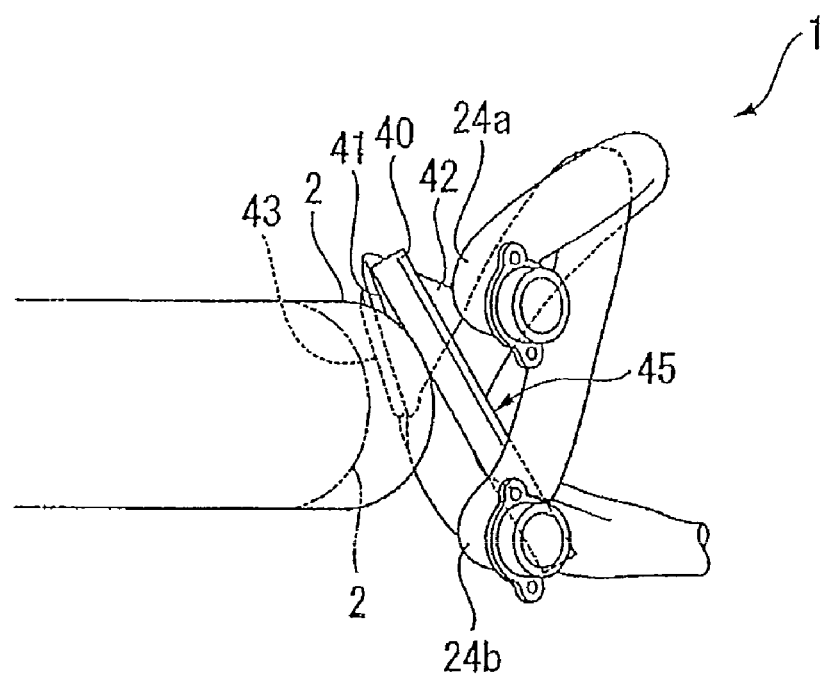
FIGS. 5(a) and 5(b) are explanatory views for explaining the effects of the embodiment of the present invention, and are left side views of the main portion corresponding to FIG. 2.
Figure 5B:
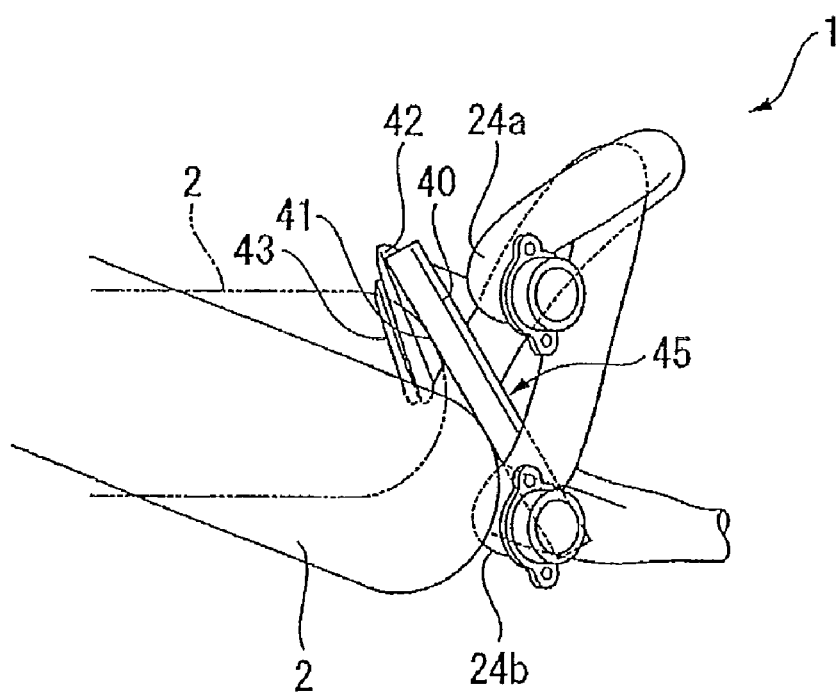

As shown in FIG. 4 and FIG. 5(a), when the front wheel 2 and the front fork 3 are compressed and displaced toward the rear of the vehicle body, the rear portion of the front wheel 2 comes close to the front portion of the main frame portion 15. At this time, since the guide 45 inclined to the vehicle-body width direction is formed by the guide member 40 and the guide bar 42 at the front portion of the main frame portion 15, when the front wheel 2 comes into contact with the guide 45, the front wheel 2 that has come close to the vehicle-body frame 5 is deformed in a way that the front wheel 2 is guided obliquely rearward along the guide 45 of FIG. 5(b). In other words, the front wheel 2 is guided obliquely rearwardly along the guide 45 so as to be forcibly steered. Accordingly, even when the front wheel 2 is deformed at the application of the excessive load, interference between the front wheel 2 and the vehicle-body frame 5 can be prevented. Thus, the deformation of the front wheel steering system is not prevented by the contact between the front wheel steering system and the vehicle-body frame 5. As a result, a displacement space (load absorbing space) of the front wheel steering system is secured, so that an excessive load which would otherwise be applied from the front wheel 2 to the vehicle-body frame 5 can be reduced.

Moreover, since the guide 45 (the guide member 40 and the guide bar 42) is inclined to the center axis in the width direction while extending from one end side to the other end side of the vehicle-body frame 5 in the width direction as described above, even when the excessive load is applied from the front wheel 2 in a state where the front wheel 2 is steered for the turning of the vehicle body or the like, the front wheel 2 is inevitably guided obliquely rearward on the guide 45. The guide 45 does not have any tips except for tips on the both sides in the width direction of the vehicle-body frame 5, which is different from the conventional case where the vehicle-body frame 5 is formed to have a shape of a bow. With this structure, even when the front wheel 2 is deformed to a position where the front wheel 2 comes into contact with the vehicle-body frame 5, the front wheel 2 is steered to be guided obliquely rearwardly along the guide member 40, not only in a case where the motorcycle 1 is traveling straight, but also in a case where the motorcycle 1 is turning to the right or the left.

Moreover, when the front wheel steering system is deformed further rearward in the vehicle body, the front portion of the front wheel 2 and the connection plate 67 of the bumper member 50 coincide with each other in position in the vehicle-body front-rear direction. Accordingly, the load applied to the front wheel 2 is also applied through the connection plate 67 of the bumper member 50. The bumper member 50 is thus deformed together with the front wheel steering system in a manner of crushing rearward in the vehicle body, thereby absorbing the load. In this event, since the bumper member 50 is formed of metal pipes, the bumper member 50 is bent and deformed more easily than a bumper member formed of a solid member at the application of the load. Accordingly, the excessive load can be more easily absorbed by use of the bumper member 50.

The load applied through the connection plate 67 acts rearward in the vehicle body from both sides of the main frames 10 respectively, via the pairs of upper pipes 51 and lower pipes 52, and also acts rearward in the vehicle body from the head pipe 6 via the center pipes 53.

More specifically, the load applied to the connection plate 67 is dispersed rightward and leftward by the front upper pipes 56 and the front lower pipes 59, and the load is also transferred through the side portion plates 68 to the center pipes 53. Further, the loads dispersed rightward and leftward by the front upper pipes 56 and the front lower pipes 59 are dispersed upward and downward by the rear upper pipes 55 and the rear lower pipes 58. As a result, the load applied to the upper pipes 51, lower pipes 52, and center pipes 53 are dispersed, so that the loads to be transferred to each of the boss portions 57 and 60 and center plate 70 is reduced. In addition, the load applied to the vehicle-body frame 5 acts evenly in the vehicle-body width direction. Thus, the vehicle body does not lose balance even at the application of the excessive load.

Moreover, the bumper member 50 is connected to the vehicle body at a position higher than the center of gravity G of the motorcycle 1 when the rider is riding. Accordingly, a moment pressing the vehicle body downward about the center of gravity G in the bumper member 50 acts on the vehicle body. For this reason, the contact load of the rear wheel 13 is increased, and the rear wheel 13 is restrained from coming off the ground. By preventing the rear wheel 13 from coming off the ground at the application of the excessive load in this way, more effective energy absorption can be performed.

According to the embodiment, the load received by the front wheel 2 can be let off obliquely rearward by disposing the guide member 40 which guides the front wheel 2 obliquely rearward at the application of the excessive load to the front wheel 2. Specifically, when the front wheel 2 is deformed to a position where the front wheel 2 comes into contact with the vehicle-body frame 5 at the application of the excessive load, it is possible to forcibly steer the front wheel 2 by guiding the front wheel 2 obliquely rearward along the guide member 40. Thus, even when the front wheel 2 is deformed at the application of the excessive load, interference between the front wheel 2 and the vehicle-body frame 5 can be prevented. Accordingly, there is no case where deformation of the front wheel steering system is prevented by the contact between the front wheel steering system and the vehicle-body frame 5. Thus, the load absorbing space for the front wheel steering system is secured. In this way, the load is effectively absorbed by the front wheel steering system and let off obliquely rearwardly, so that the load to act on the vehicle-body frame 5 from the front wheel 2 is reduced. As a result, the reduction of the contact load of the rear wheel 13 can be suppressed.

Moreover, since the guide member 40 extends from one side to the other side of the vehicle-body frame 5 while being inclined to the width direction of the vehicle-body frame 5, the guide member 40 does not have any tips except for the tips at the both sides in the width direction of the vehicle-body frame 5, which is different from the conventional case where the vehicle-body frame 5 is formed to have a shape of a bow. With this structure, when the front wheel 2 is deformed to a position where the front wheel 2 comes into contact with the vehicle-body frame 5 at the application of the excessive load, the front wheel 2 is steered to be guided obliquely rearward along the guide member 40, not only in a case where the motorcycle 1 is traveling straight, but also in a case where the motorcycle 1 is turning to the right or the left. Accordingly, the interference between the front wheel 2 and the vehicle-body frame 5 is prevented, and the load to act on the vehicle-body frame 5 through the front wheel 2 can be further reduced. Thus, increase of pitching due to a moment remaining in the vehicle body of the motorcycle 1, for example, can be effectively suppressed.

In addition, the bumper member 50 extending forward of the head pipe 6 is attached to the vehicle-body frame 5 in such a manner as to surround the front fork 3, thereby protecting the front fork 3.

In particular, the load applied to the front wheel 2 is also applied to the bumper member 50. Thus, the excessive load acting on the front wheel 2 can be absorbed also by the bumper member 50. In this case, the connection positions of the bumper member 50 on the vehicle-body frame 5 are set to be higher than the center of gravity G of the motorcycle 1 when the rider is riding. Thus, the moment acts on the motorcycle 1 in such a direction that the contact load of the rear wheel 13 increases, at the application of the excessive load to the bumper member 50. As a result, the reduction of the contact load of the rear wheel 13 at the application of the excessive load can be further suppressed.

Note that, the present invention is not limited to the above-described embodiment, and various modifications in design can be made without departing from the scope of the present invention.

For example, the case where the guide member 40 is supported by the stay extending from the engine 22 is described above. However, the guide member 40 may be provided to the above-described engine hanger 14, or may be provided on another stay provided to extend from the main frames 10.

Moreover, in the above-described embodiment, the example where the guide member is formed of a plate for rolling is described. However, the guide member is not limited to the plate member, and a block-shaped member or a pipe-shaped member may be employed. In addition, in a case where the plate member is used as the guide member, the cross-sectional shape of the plate is not limited to a rectangle, and a plate having a square U-shaped cross-section maybe employed instead.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is clamed is:

1. A vehicle-body structure for a motorcycle including a steering system support part supporting a front wheel in front of a vehicle-body frame, the vehicle-body structure comprising:
    a guide member disposed rearwardly of the front wheel and at a front portion of the vehicle-body frame, said guide member guiding the front wheel obliquely rearwardly during an application of an excessive load to the front wheel;
    wherein the guide member extends from one side to the other side of the vehicle-body frame in a width direction thereof while being inclined to the width direction of the vehicle-body frame, and further comprising
    a guide bar disposed at a position below the guide member, wherein inclined front surfaces of the guide bar and the guide member are approximately parallel to each other.

2. The vehicle-body structure for a motorcycle according to claim 1, further comprising a bumper member mounted on the vehicle-body frame at a position above the guide member, the bumper member extending forward of the steering system support part.

3. The vehicle-body structure for a motorcycle according to claim 2, wherein a position at which the bumper member is supported on the vehicle-body frame is set higher than a center of gravity of the motorcycle when operated by a rider.

4. The vehicle-body structure for a motorcycle according to claim 3, wherein the bumper member is attached to surround a front fork pivotally supporting the front wheel.

5. The vehicle-body structure for a motorcycle according to claim 3, wherein
    the bumper member includes a pair of upper pipes and a pair of lower pipes,
    each pair of the pair of upper pipes and the pair of lower pipes are connected at base ends thereof respectively to the sides of the vehicle-body frame in the width direction thereof, each of the upper and lower pipes being connected at a single portion on the vehicle-body frame,
    the upper pipes and the lower pipes are connected at front ends thereof to each other, and
    the upper pipes and the lower pipes are formed into a substantially triangular shape when viewed from a side face of the vehicle-body frame.

6. The vehicle-body structure for a motorcycle according to claim 2, wherein the bumper member is attached to surround a front fork pivotally supporting the front wheel.

7. The vehicle-body structure for a motorcycle according to claim 6, wherein the bumper member is formed by bending a metal pipe member into an arch shape.

8. The vehicle-body structure for a motorcycle according to claim 2, wherein
    the bumper member includes a pair of upper pipes and a pair of lower pipes,
    each pair of the pair of upper pipes and the pair of lower pipes are connected at base ends thereof respectively to the sides of the vehicle-body frame in the width direction thereof, each of the upper and lower pipes being connected at a single portion on the vehicle-body frame,
    the upper pipes and the lower pipes are connected at front ends thereof to each other, and
    the upper pipes and the lower pipes are formed into a substantially triangular shape when viewed from a side face of the vehicle-body frame.

9. The vehicle-body structure for a motorcycle according to claim 2, wherein
    the bumper member includes a pair of upper pipes and a pair of lower pipes,
    each pair of the pair of upper pipes and the pair of lower pipes are connected at base ends thereof respectively to the sides of the vehicle-body frame in the width direction thereof, each of the upper and lower pipes being connected at a single portion on the vehicle-body frame,
    the upper pipes and the lower pipes are connected at front ends thereof to each other, and
    the upper pipes and the lower pipes are formed into a substantially triangular shape when viewed from a side face of the vehicle-body frame.

10. The vehicle-body structure for a motorcycle according to claim 1, wherein the guide bar is a pair of guide bars extending forward from a pair of exhaust pipes, respectively, the guide member and the guide bars constituting a guide at a position rearwardly of the front wheel.

11. A vehicle-body structure for a motorcycle including a steering system support part supporting a front wheel in front of a vehicle-body frame, the vehicle-body structure comprising:
- a guide member disposed rearwardly of the front wheel and at a front portion of the vehicle-body frame, said guide member guiding the front wheel obliquely rearwardly during an application of an excessive load to the front wheel;
- wherein the guide member extends from one side to the other side of the vehicle-body frame in a width direction thereof while being inclined to the width direction of the vehicle-body frame, wherein the guide member is mounted to a stay extending forwardly from an engine of the motorcycle and extends from a left side to a right side of the vehicle-body frame.

12. A vehicle-body structure for a motorcycle comprising:
- a vehicle-body frame;
- a steering system support part supporting a front wheel in front of the vehicle-body frame;
- a guide member disposed rearwardly of the front wheel; and
- a stay for mounting the guide member relative to the motorcycle at a front portion of the vehicle-body frame, said guide member guiding the front wheel obliquely rearwardly during an application of an excessive load to the front wheel;
- wherein the guide member extends from one side to the other side of the vehicle-body frame in a width direction thereof while being inclined to the width direction of the vehicle-body frame.

13. The vehicle-body structure for a motorcycle according to claim 12, further comprising a bumper member mounted on the vehicle-body frame at a position above the guide member, the bumper member extending forward of the steering system support part.

14. The vehicle-body structure for a motorcycle according to claim 13, wherein a position at which the bumper member is supported on the vehicle-body frame is set higher than a center of gravity of the motorcycle when operated by a rider.

15. The vehicle-body structure for a motorcycle according to claim 14, wherein the bumper member is attached to surround a front fork pivotally supporting the front wheel.

16. The vehicle-body structure for a motorcycle according to claim 15, wherein the bumper member is formed by bending a metal pipe member into an arch shape.

17. The vehicle-body structure for a motorcycle according to claim 14, wherein
- the bumper member includes a pair of upper pipes and a pair of lower pipes,
- each pair of the pair of upper pipes and the pair of lower pipes are connected at base ends thereof respectively to the sides of the vehicle-body frame in the width direction thereof, each of the upper and lower pipes being connected at a single portion on the vehicle-body frame,
- the upper pipes and the lower pipes are connected at front ends thereof to each other, and
- the upper pipes and the lower pipes are formed into a substantially triangular shape when viewed from a side face of the vehicle-body frame.

18. The vehicle-body structure for a motorcycle according to claim 13, wherein the bumper member is attached to surround a front fork pivotally supporting the front wheel.

19. The vehicle-body structure for a motorcycle according to claim 18, wherein the bumper member is formed by bending a metal pipe member into an arch shape.

20. The vehicle-body structure for a motorcycle according to claim 12, wherein the guide member is mounted to a stay extending forwardly from an engine of the motorcycle and extends from a left side to a right side of the vehicle-body frame.

* * * * *